(12) United States Patent
Kawashima et al.

(10) Patent No.: US 11,005,327 B2
(45) Date of Patent: May 11, 2021

(54) ROTATING ELECTRIC MACHINE AND ROTATING ELECTRIC MACHINE PRODUCTION METHOD

(71) Applicant: MITSUBISHI ELECTRIC CORPORATION, Tokyo (JP)

(72) Inventors: Koji Kawashima, Tokyo (JP); Shingo Kingetsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 454 days.

(21) Appl. No.: 16/070,190

(22) PCT Filed: Jan. 26, 2016

(86) PCT No.: PCT/JP2016/052121
§ 371 (c)(1),
(2) Date: Jul. 13, 2018

(87) PCT Pub. No.: WO2017/130287
PCT Pub. Date: Aug. 3, 2017

(65) Prior Publication Data
US 2019/0044407 A1     Feb. 7, 2019

(51) Int. Cl.
*H02K 5/00*     (2006.01)
*H02K 5/124*    (2006.01)
(Continued)

(52) U.S. Cl.
CPC ............ *H02K 5/124* (2013.01); *F16J 15/406* (2013.01); *F16J 15/441* (2013.01); *H02K 5/15* (2013.01);
(Continued)

(58) Field of Classification Search
CPC ............ H02K 5/10; H02K 5/124; H02K 5/15; H02K 5/1672; H02K 7/083; H02K 7/086; H02K 15/14; H02K 7/1823
See application file for complete search history.

(56) References Cited

U.S. PATENT DOCUMENTS 7,432,620 B2 * 10/2008 Freal .................... H02K 5/124
                                                    277/422
8,169,110 B2 *  5/2012 Swales ................. H02K 11/048
                                                    310/54
(Continued)

FOREIGN PATENT DOCUMENTS

CN      104823362 A      8/2015
JP      58-005568 A      1/1983
(Continued)

OTHER PUBLICATIONS

International Search Report (PCT/ISA/210) dated May 10, 2016, by the Japanese Patent Office as the International Searching Authority for International Application No. PCT/JP2016/052121.
(Continued)

*Primary Examiner* — Thanh Lam
(74) *Attorney, Agent, or Firm* — Buchanan Ingersoll & Rooney PC

(57) ABSTRACT

This rotating electric machine includes: a rotor having a shaft; a stator formed around the rotor; a seal ring formed around the shaft and having a plurality of through holes; a gland seal formed so as to surround the seal ring and having an oil feed port; and a partition plate formed between the seal ring and the gland seal, wherein the partition plate is formed at a position opposed to the oil feed port and is fixed to an upper wall and a lower wall in an axial direction of the gland seal, and the partition plate has a reinforcing plate at such a position as not to obstruct the oil feed port, the reinforcing plate being fixed to a side wall of the partition (Continued)

plate on a gland seal side and being in close contact with a circumferential wall of the gland seal.

20 Claims, 14 Drawing Sheets

(51) Int. Cl.
| | |
|---|---|
| *H02K 5/15* | (2006.01) |
| *F16J 15/44* | (2006.01) |
| *F16J 15/40* | (2006.01) |
| *H02K 7/18* | (2006.01) |
| *H02K 9/14* | (2006.01) |
| *H02K 15/14* | (2006.01) |
| *F01D 15/10* | (2006.01) |

(52) U.S. Cl.
CPC ............ *H02K 7/1823* (2013.01); *H02K 9/14* (2013.01); *H02K 15/14* (2013.01); *F01D 15/10* (2013.01)

(56) References Cited

U.S. PATENT DOCUMENTS

2005/0206249 A1* 9/2005 Hashiba .................. F16J 15/26
310/54
2007/0069596 A1* 3/2007 Hemmi .................. H02K 9/193
310/90
2016/0134167 A1* 5/2016 Kawashima ............. H02K 5/10
310/88

FOREIGN PATENT DOCUMENTS

| JP | 58-186353 A | 10/1983 |
|---|---|---|
| JP | 61-085030 A | 4/1986 |
| JP | 64-008839 A | 1/1989 |
| JP | 04-266666 A | 9/1992 |
| JP | 09-303406 A | 11/1997 |
| JP | 2010-019306 A | 1/2010 |
| JP | 5575347 B1 | 8/2014 |

OTHER PUBLICATIONS

Written Opinion (PCT/ISA/237) dated May 10, 2016, by the Japanese Patent Office as the International Searching Authority for International Application No. PCT/JP2016/052121.

* cited by examiner

ROTATING ELECTRIC MACHINE AND ROTATING ELECTRIC MACHINE PRODUCTION METHOD

TECHNICAL FIELD

The present invention relates to a rotating electric machine and a rotating electric machine production method that allow a partition plate to be additionally provided easily.

BACKGROUND ART

In conventional rotating electric machines such as turbine generator, gas such as hydrogen is used as a cooling medium for cooling the inside.

The cooling medium is sealed in the rotating electric machine by a shaft seal device using a seal ring (see, for example, Patent Documents 1 to 5).

In the shaft seal device, oil is supplied through an oil feed pipe to a backside chamber behind the seal ring. The oil then moves toward the inner circumferential side of the seal ring.

In such a structure, the temperature of the back surface of the seal ring decreases at a part near an oil feed port. Since the seal ring cannot expand, an oil film surrounding the shaft is thinned at a part near the oil feed port, so that the temperature of the oil film increases. The temperature increase of the oil film causes damage on the seal ring.

In order to prevent this, a partition plate is provided at a position opposed to the oil feed port, in the gland seal. Thus, the back surface of the seal ring is prevented from being locally cooled near the oil feed port (see, for example, Patent Document 6).

CITATION LIST

Patent Document

Patent Document 1: Japanese Laid-Open Patent Publication No. 58-5568
Patent Document 2: Japanese Laid-Open Patent Publication No. 58-186353
Patent Document 3: Japanese Laid-Open Patent Publication No. 61-85030
Patent Document 4: Japanese Laid-Open Patent Publication No. 64-8839
Patent Document 5: Japanese Laid-Open Patent Publication No. 9-303406
Patent Document 6: Japanese Patent No. 5575347

SUMMARY OF THE INVENTION

Problems to be Solved by the Invention

In the conventional rotating electric machines, for providing the partition plate, it is necessary to ensure oil feed paths on the outer side of the partition plate and on the inner side of the partition plate. Therefore, the gland seal needs to have a groove for inserting the partition plate. Thus, there is a problem that it is impossible to additionally provide the partition plate to the gland seal in which a groove has not been formed in advance.

The present invention has been made to solve the above problem, and an object of the present invention is to provide a rotating electric machine and a rotating electric machine production method that allow a partition plate to be additionally provided easily.

Solution to the Problems

A rotating electric machine of the present invention includes: a rotor having a shaft; a stator formed around the rotor; a seal ring formed around the shaft and having a plurality of through holes; a gland seal formed so as to surround the seal ring and having an oil feed port; a partition plate formed between the seal ring and the gland seal; and a housing which houses the rotor and the stator and to which the gland seal is fixed, wherein the partition plate is formed at a position opposed to the oil feed port and is fixed to at least one of an upper wall and a lower wall in an axial direction of the gland seal, and the partition plate has a reinforcing plate at such a position as not to obstruct the oil feed port, the reinforcing plate being fixed to a side wall of the partition plate on a gland seal side and being in close contact with a circumferential wall of the gland seal.

A method for manufacturing the rotating electric machine of the present invention includes, in the rotating electric machine, placing the partition plate at a position opposed to the oil feed port, and bringing the reinforcing plate into contact with the circumferential wall of the gland seal, and in this state, welding and fixing the partition plate to the upper wall or the lower wall of the gland seal.

Effect of the Invention

The rotating electric machine and the rotating electric machine production method of the present invention allow the partition plate to be additionally provided easily.

DESCRIPTION OF EMBODIMENTS

Embodiment 1

Figure 1:
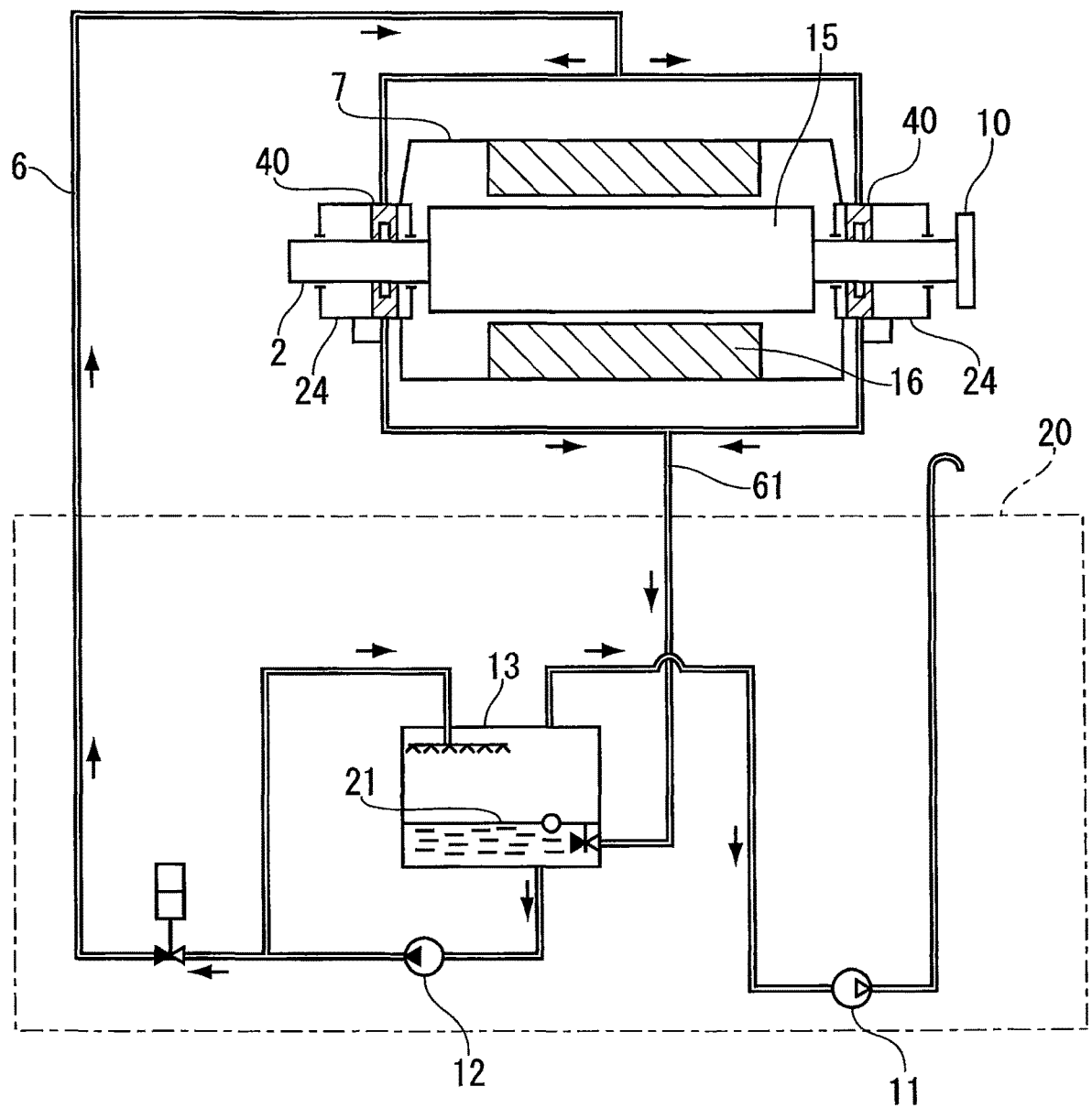
FIG. 1 is a diagram showing the structure of a rotating electric machine of embodiment 1 of the present invention.
Figure 2:
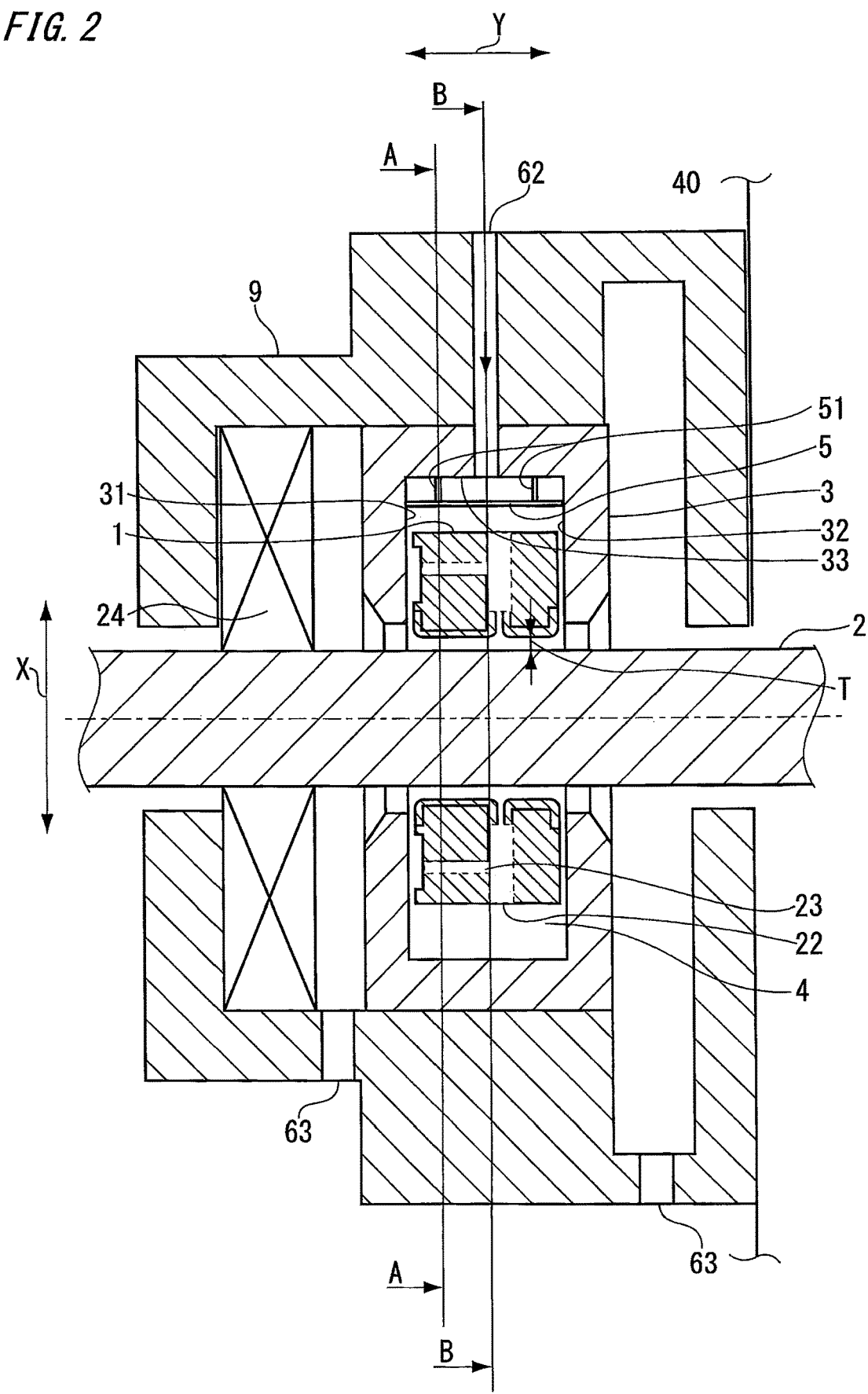
FIG. 2 is a sectional view showing the structure of a shaft seal portion of the rotating electric machine shown in FIG. 1.
Figure 3:
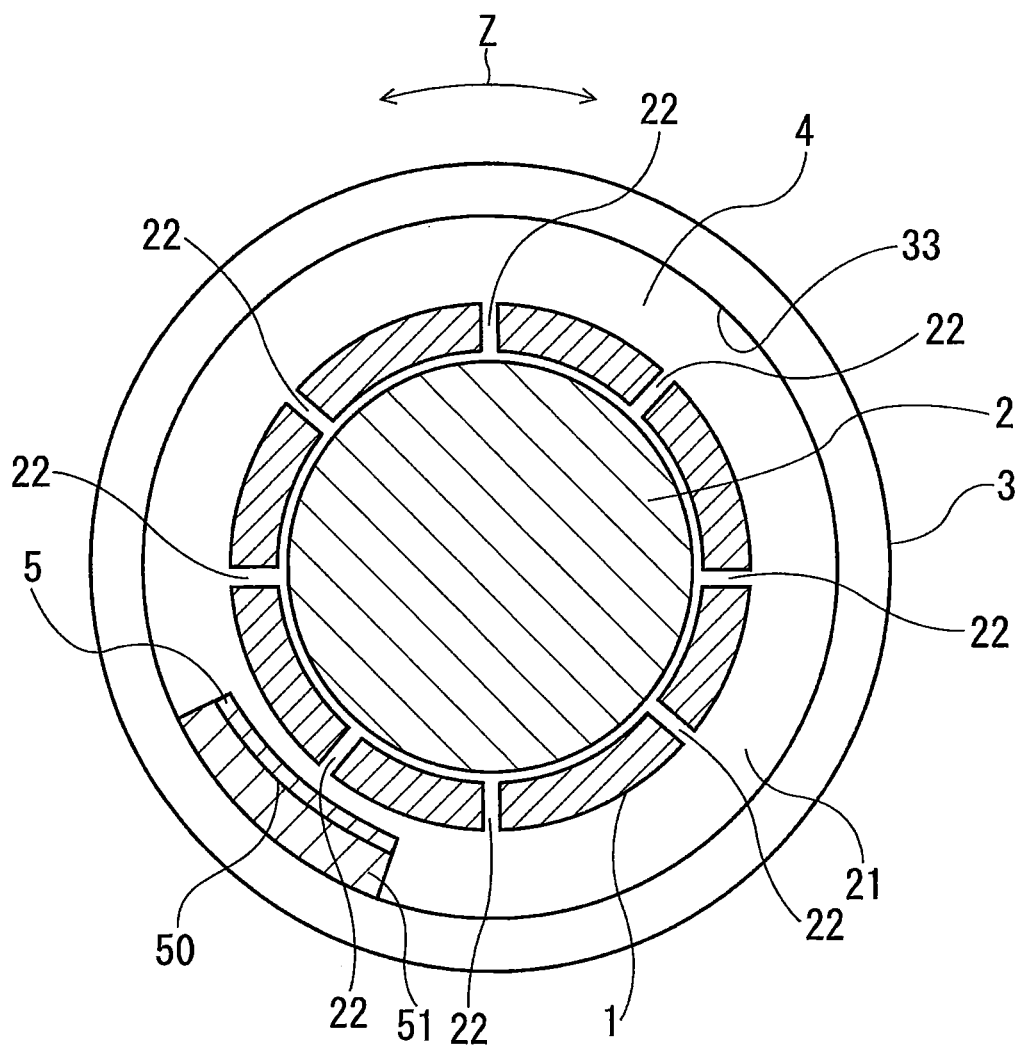
FIG. 3 is a sectional view showing an A-A cross section of the shaft seal portion shown in FIG. 2.
Figure 4:
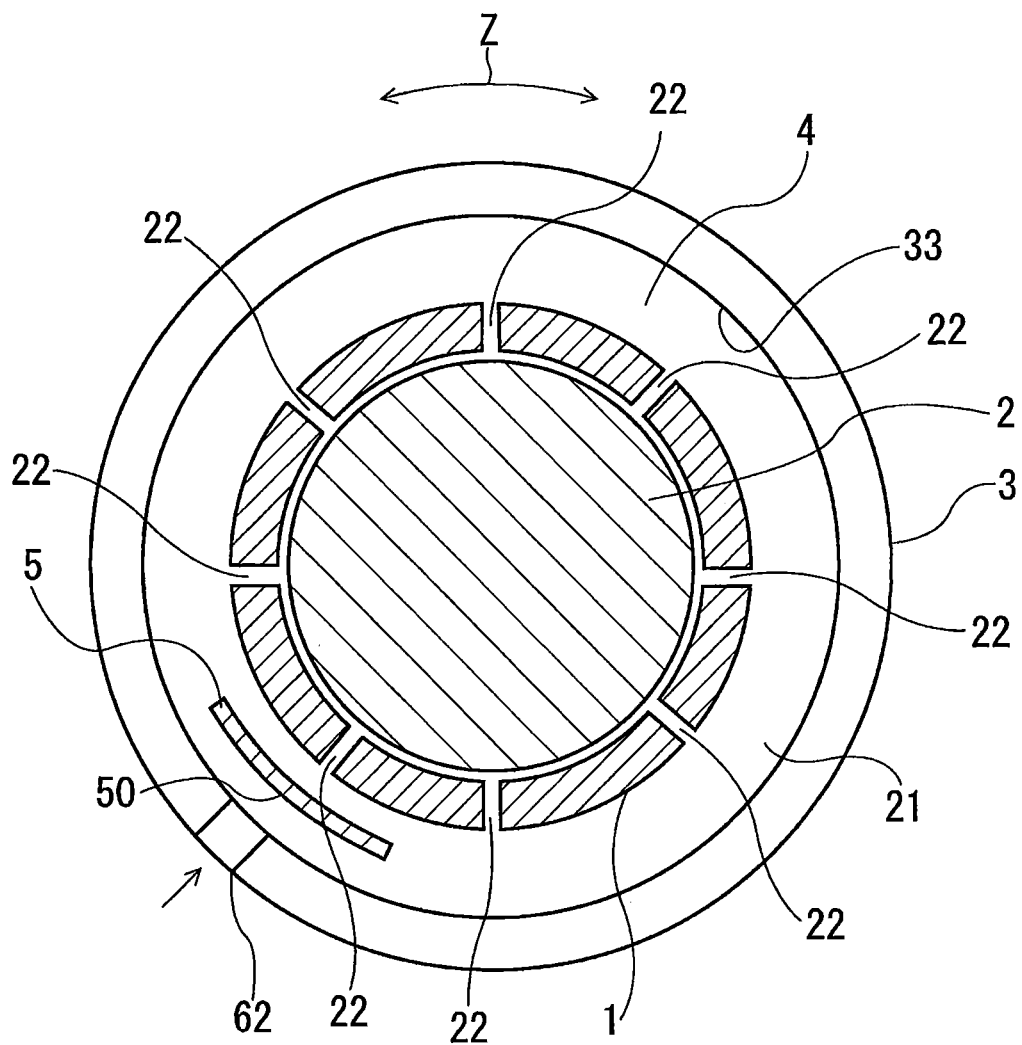
FIG. 4 is a sectional view showing a B-B cross section of the shaft seal portion shown in FIG. 2.
Figure 5:
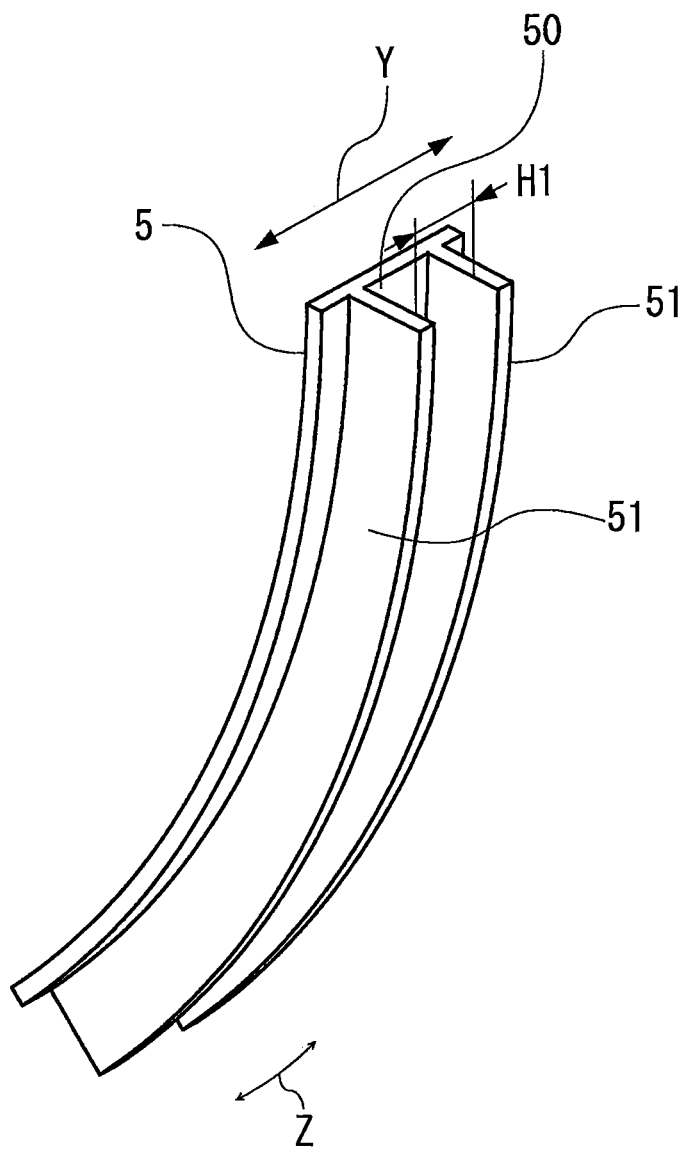
FIG. 5 is a perspective view showing the structure of a partition plate and reinforcing plates of the shaft seal portion shown in FIG. 3.
Figure 6:
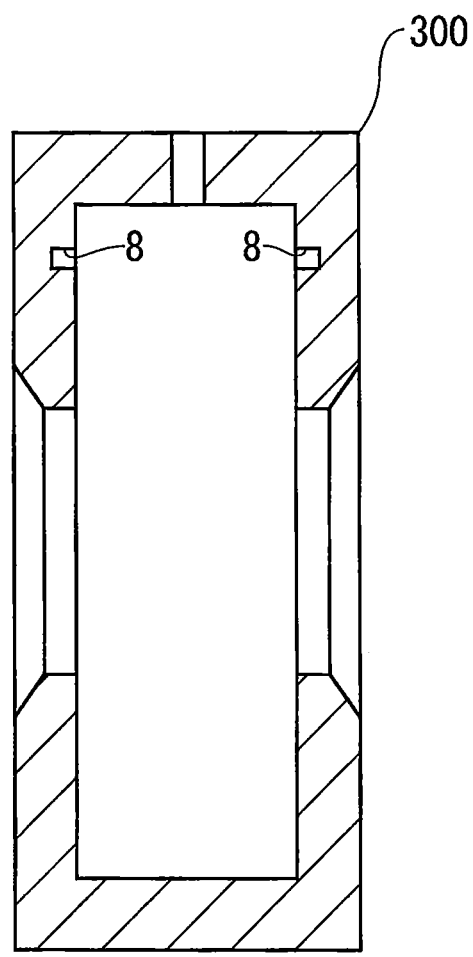
FIG. 6 is a sectional view showing the structure of a conventional gland seal.

Hereinafter, embodiments of the invention of the present application will be described. FIG. 1 is a diagram showing the structure of a rotating electric machine 10 and an oil feed device 20 according to embodiment 1 of the present invention. FIG. 2 is a sectional view showing the structure of a shaft seal portion 40 of the rotating electric machine shown in FIG. 1. In FIG. 2, the left side on the drawing is outside the machine, and the right side on the drawing is inside the machine. FIG. 3 is a sectional view showing an A-A cross section of a gland seal 3 of the shaft seal portion 40 shown in FIG. 2. FIG. 4 is a sectional view showing a B-B cross section of the gland seal 3 of the shaft seal portion 40 shown in FIG. 2. FIG. 5 is a perspective view showing the structure of a partition plate and reinforcing plates of the shaft seal portion 40 shown in FIG. 3. FIG. 6 is a sectional view showing the structure of a conventional gland seal.

FIG. 1 will be described. The rotating electric machine 10 such as a turbine generator includes a housing 7, a rotor 15, a stator 16, and shaft seal portions 40. The rotor 15 is provided with a shaft 2. The stator 16 is formed around the rotor 15. The housing 7 houses the rotor 15 and the stator 16. The shaft seal portions 40 are formed being fixed to both ends of the shaft 2 of the housing 7, using brackets 9. Plain bearing portions 24 are provided in the shaft seal portion 40 and support both ends of the shaft 2.

The oil feed device 20 includes a vacuum pump 11, a seal oil pump 12, and a vacuum tank 13. The vacuum tank 13 stores seal oil 21. The vacuum pump 11 keeps the degree of vacuum in the vacuum tank 13. The seal oil pump 12 feeds the seal oil 21 from the vacuum tank 13 to an oil feed pipe 6. The oil feed pipe 6 connects the rotating electric machine 10 and the oil feed device 20. The seal oil 21 is supplied from the oil feed device 20 through the oil feed pipe 6 to each shaft seal portion 40 of the rotating electric machine 10. The seal oil 21 is collected from the shaft seal portions 40 through a collection pipe 61 to the vacuum tank 13. The inside of the housing 7 of the rotating electric machine 10 is filled with hydrogen gas. The hydrogen gas circulates in the housing 7 in order to enhance a cooling effect.

FIG. 2 to FIG. 5 will be described. The shaft seal portions 40 are for preventing the hydrogen gas from leaking from the housing 7. In each shaft seal portion 40, the seal oil 21 having a higher pressure than the pressure of the hydrogen gas in the housing 7 is supplied between the shaft 2 and a seal ring 1. Each shaft seal portion 40 includes the seal ring 1, the gland seal 3, the bracket 9, a partition plate 5, and reinforcing plates 51. The shaft 2 penetrates through the bracket 9, and the bracket 9 houses the seal ring 1, the gland seal 3, and the plain bearing portion 24.

The seal ring 1 is formed around the shaft 2. The gland seal 3 is formed so as to surround the seal ring 1 and house the seal ring 1. An oil feed port 62 connected to the oil feed pipe 6 is formed in the bracket 9 and the gland seal 3. An oil discharge port 63 connected to the collection pipe 61 is formed in the bracket 9. A backside chamber 4 is formed by a space between the seal ring 1 and the gland seal 3. The seal oil 21 flows from the oil feed port 62 of the gland seal 3 into the backside chamber 4, and then flows out through the oil discharge port 63 of the bracket 9.

The seal oil 21 fills between the bracket 9 and the shaft 2. The seal ring 1 is provided being floated from the shaft 2 by the pressure of the oil film of the seal oil 21 filling a gap T in a radial direction X between the seal ring 1 and the shaft 2. The length of the gap T is determined so that the seal ring 1 will not contact with the shaft 2 during operation of the rotating electric machine 10. In order to decrease the amount of the seal oil 21, it is effective to shorten the gap T. The gap T is as small as about 0.1 mm, and an important requirement is that the seal ring 1 will not be deformed.

Through holes 22 are formed penetrating the seal ring 1 in the radial direction X. A plurality of, here, eight through holes 22 are formed at intervals in a circumferential direction Z of the seal ring 1. Through holes 23 communicate with the through holes 22 and penetrate the seal ring 1 toward the machine outside in an axial direction Y of the shaft 2.

The partition plate 5 is formed, between the seal ring 1 and the gland seal 3, at a position opposed to the oil feed port 62. The partition plate 5 is formed at only a part in the circumferential direction Z of the seal ring 1. The partition plate 5 is fixed to an upper wall 31 and a lower wall 32 in the axial direction Y of the gland seal 3. For example, the partition plate 5 is fixed to the gland seal 3 by welding. The partition plate 5 may be fixed to at least one of the upper wall 31 and the lower wall 32 in the axial direction Y of the gland seal 3 as long as the provided position of the partition plate 5 can be maintained.

The reinforcing plates 51 are formed at such positions as not to obstruct the oil feed port 62, and the reinforcing plates 51 are fixed to a side wall 50 of the partition plate 5 on the gland seal 3 side and are in close contact with a circumferential wall 33 of the gland seal 3.

The reinforcing plates 51 are formed at a plurality of, here, two different locations apart from each other by an interval H1 in the axial direction Y of the partition plate 5 (see FIG. 5). The seal oil 21 flows between the reinforcing plates 51 formed at the two respective locations in the axial direction Y. Thus, paths for the seal oil 21 are ensured on the outer side and the inner side in the radial direction X of the backside chamber 4 partitioned by the partition plate 5. It is noted that the reinforcing plate 51 may be formed at one location in the axial direction Y of the partition plate 5 as long as the position of the reinforcing plate 51 can be ensured in provision of the partition plate 5.

Since the partition plate 5 is formed at a position opposed to the oil feed port 62, the backside chamber 4 is divided by the partition plate 5 into two parts in the radial direction X only at a location near the oil feed port 62. The partition plate 5 prevents the seal oil 21 supplied from the oil feed port 62, from directly colliding with the seal ring 1. Thus, the seal ring 1 is prevented from being extremely cooled at a position opposed to the oil feed port 62. The seal oil 21 supplied from the oil feed port 62 collides with the partition plate 5 and splits, then to be supplied to the backside chamber 4. Therefore, providing the partition plate 5 at a predetermined position in the radial direction X of the gland seal 3 is important for ensuring predetermined paths for the seal oil 21 because performance is greatly influenced.

The partition plate 5 is, for example, made of metal, e.g., iron, and has a thin thickness of about 3 mm to 5 mm. The radius in the radial direction X of the gland seal 3 is about 300 mm. Therefore, with such a thin partition plate 5 alone, it is difficult to accurately provide the partition plate 5 at a predetermined position with respect to such a large gland seal 3. Further, even after the partition plate 5 is provided, it might become difficult to maintain this provided position against the pressure and flow of the seal oil 21 and the like.

However, in embodiment 1, the reinforcing plates 51 of the partition plate 5 are formed in close contact with the circumferential wall 33 of the gland seal 3, whereby it is ensured that the provided position of the partition plate 5 in the radial direction X of the gland seal 3 is at a predetermined position. For the seal oil 21, paths are ensured by the partition plate 5 and the reinforcing plates 51, and the seal oil 21 passes through the through holes 22 of the seal ring 1 to radially disperse from the outer side in the radial direction X of the seal ring 1 to the inner side in the radial direction X of the seal ring 1. The seal oil 21 supplied between the shaft 2 and the seal ring 1 forms an oil film between the shaft 2 and the seal ring 1, thereby sealing the hydrogen gas filling the rotating electric machine 10.

A method for producing the rotating electric machine of embodiment 1 configured as described above will be described. First, the partition plate 5 is placed, between the seal ring 1 and the gland seal 3, at a position opposed to the oil feed port 62. At this time, the placement is performed while the reinforcing plates 51 are in contact with the circumferential wall 33 of the gland seal 3. Thus, the position of the partition plate 5 in the radial direction X of the gland seal 3 is located at a predetermined position.

While the reinforcing plates 51 are kept in contact with the circumferential wall 33 of the gland seal 3, both ends in the circumferential direction Z of the partition plate 5 are respectively welded and fixed to the upper wall 31 and the lower wall 32 of the gland seal 3. By fixing the partition plate 5 to the gland seal 3 in this way, it is possible to provide the partition plate 5 to the gland seal 3 while keeping a distance from the circumferential wall 33 of the gland seal 3. In addition, the reinforcing plates 51 are kept in close contact with the circumferential wall 33 of the gland seal 3.

Next, provision of a partition plate in a conventional gland seal 300 will be described with reference to FIG. 6. The conventional gland seal 300 has grooves 8 for providing the partition plate. The partition plate is provided by being inserted into the grooves 8. The position of the partition plate provided between the seal ring and the gland seal 300, in the radial direction X of the gland seal 300, is fixed with the formation positions of the grooves 8. Therefore, in the conventional case, the position of the partition plate in the radial direction X of the gland seal 300 can be set at a desired location owing to the formation positions of the grooves 8.

However, it is necessary to form the grooves 8 in the gland seal 300 in advance. In the case of providing the partition plate to the gland seal 300 having no grooves 8, it is conceivable that the partition plate is fixed to the gland seal 3 by welding or the like. The provided position of the partition plate in the radial direction X of the gland seal 300 needs to be precisely at a predetermined position. Therefore, if the partition plate is simply fixed to the gland seal 300 by welding or the like, there is a possibility that the position where the partition plate is provided in the radial direction X of the gland seal 300 becomes unstable and the partition plate cannot be provided at a desired position.

Therefore, in embodiment 1 of the present invention, in order to solve this problem, the partition plate 5 is provided with the reinforcing plates 51, and the rotating electric machine production method is implemented as described above.

As described above, since the partition plate 5 is provided with the reinforcing plates 51, it becomes possible to provide the partition plate 5 at a predetermined position in the radial direction X of the gland seal 3, without forming grooves in the gland seal 3. In addition, since the partition plate 5 is provided with the reinforcing plates 51, it is possible to further prevent the partition plate 5 from being displaced or deformed by the pressure of the seal oil 21, flow of the seal oil 21, and the like.

In the rotating electric machine and the rotating electric machine production method of embodiment 1 configured as described above, the partition plate is provided, thereby preventing temperature variation in the circumferential direction of the seal ring and thus suppressing deformation. This makes it possible to reduce the gap between the seal ring and the shaft and decrease the oil amount. In such adjustment, the provided position of the partition plate in the radial direction of the gland seal is required to be precise. Since the partition plate is provided with the reinforcing plates in close contact with the circumferential wall of the gland seal, highly accurate placement can be performed. Thus, the effects shown above can be sufficiently exerted. Therefore, it is possible to additionally provide the partition plate easily, without forming grooves or the like in the gland seal.

In addition, since the reinforcing plates are formed at a plurality of different locations in the axial direction of the partition plate, it becomes possible to perform highly accurate placement of the partition plate in the radial direction of the gland seal.

Embodiment 2

Figure 7:
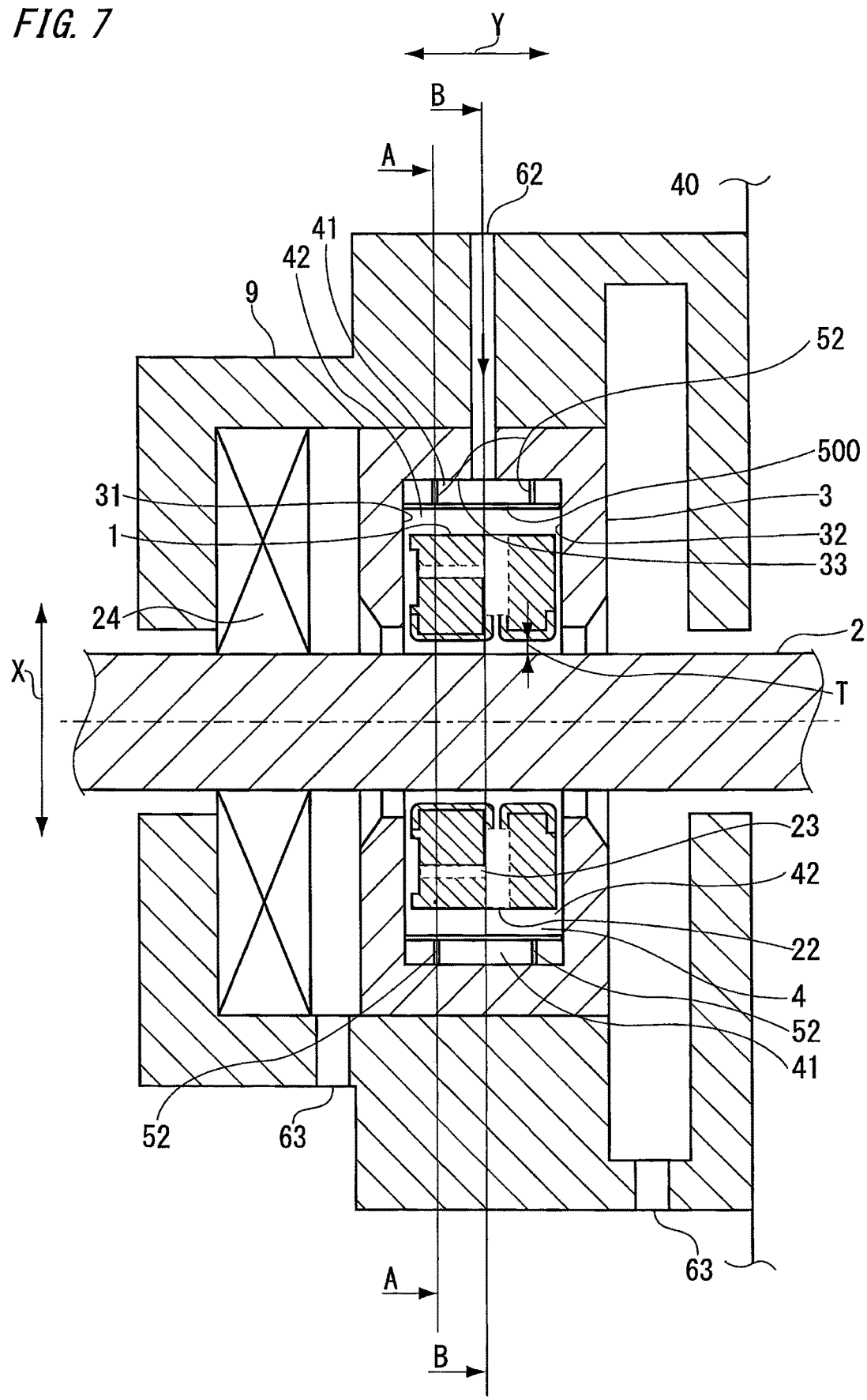
FIG. 7 is a sectional view showing the structure of a shaft seal portion of a rotating electric machine of embodiment 2 of the present invention.
Figure 8:
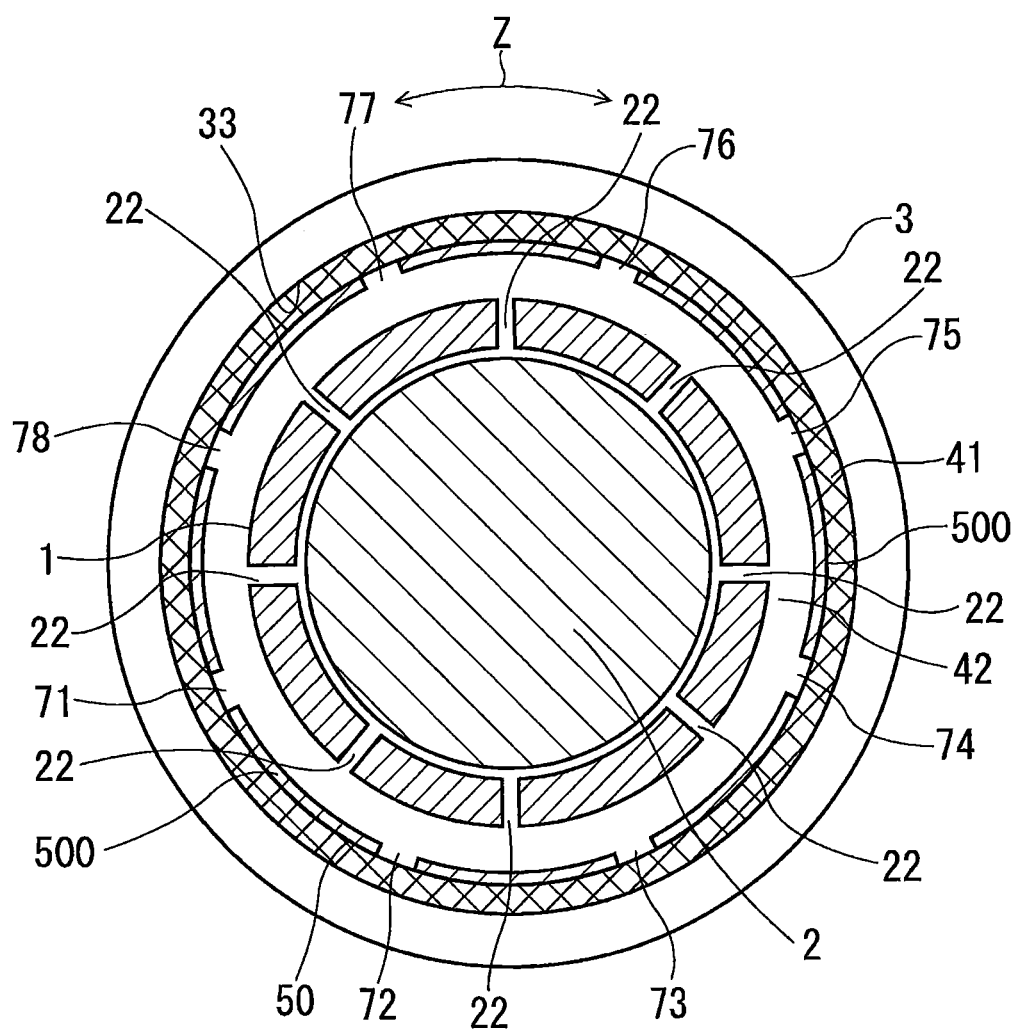
FIG. 8 is a sectional view showing an A-A cross section of the shaft seal portion shown in FIG. 7.
Figure 9:
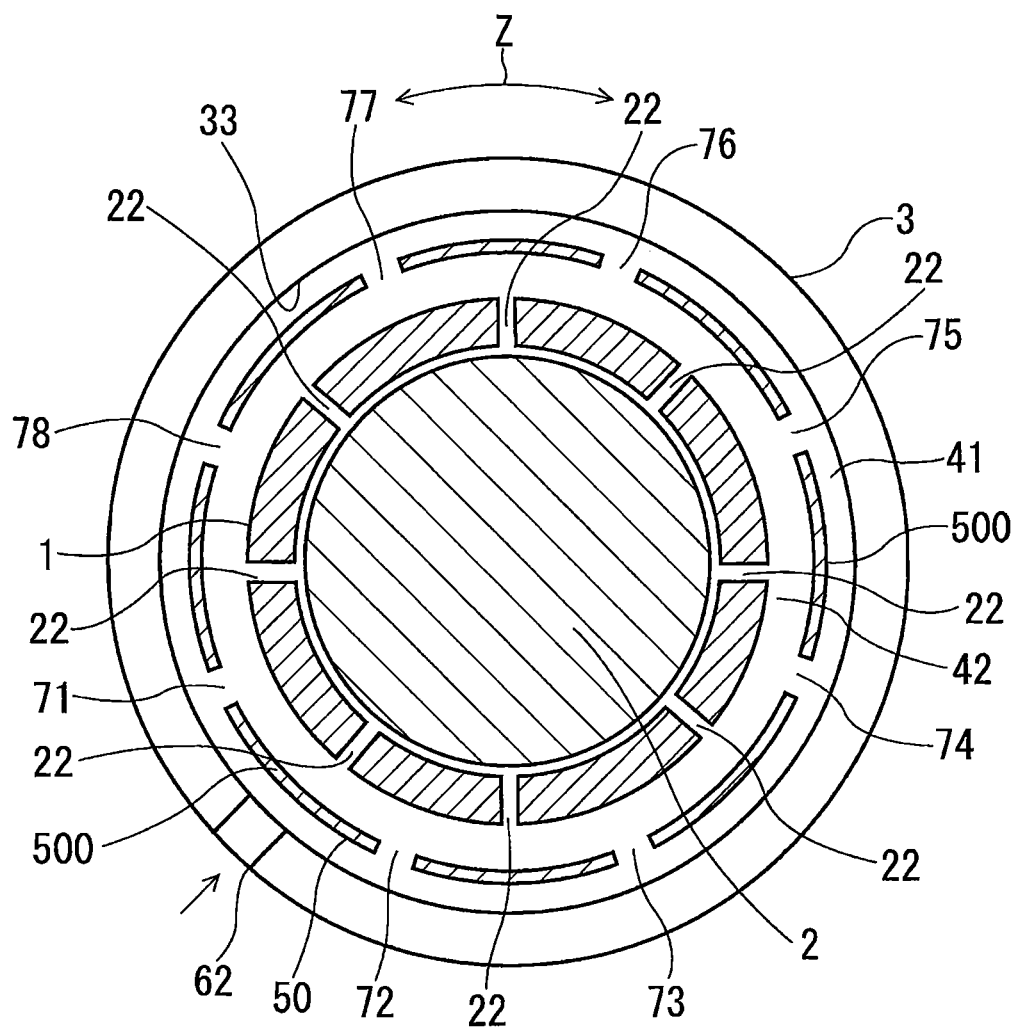
FIG. 9 is a sectional view showing a B-B cross section of the shaft seal portion shown in FIG. 7.
Figure 10:
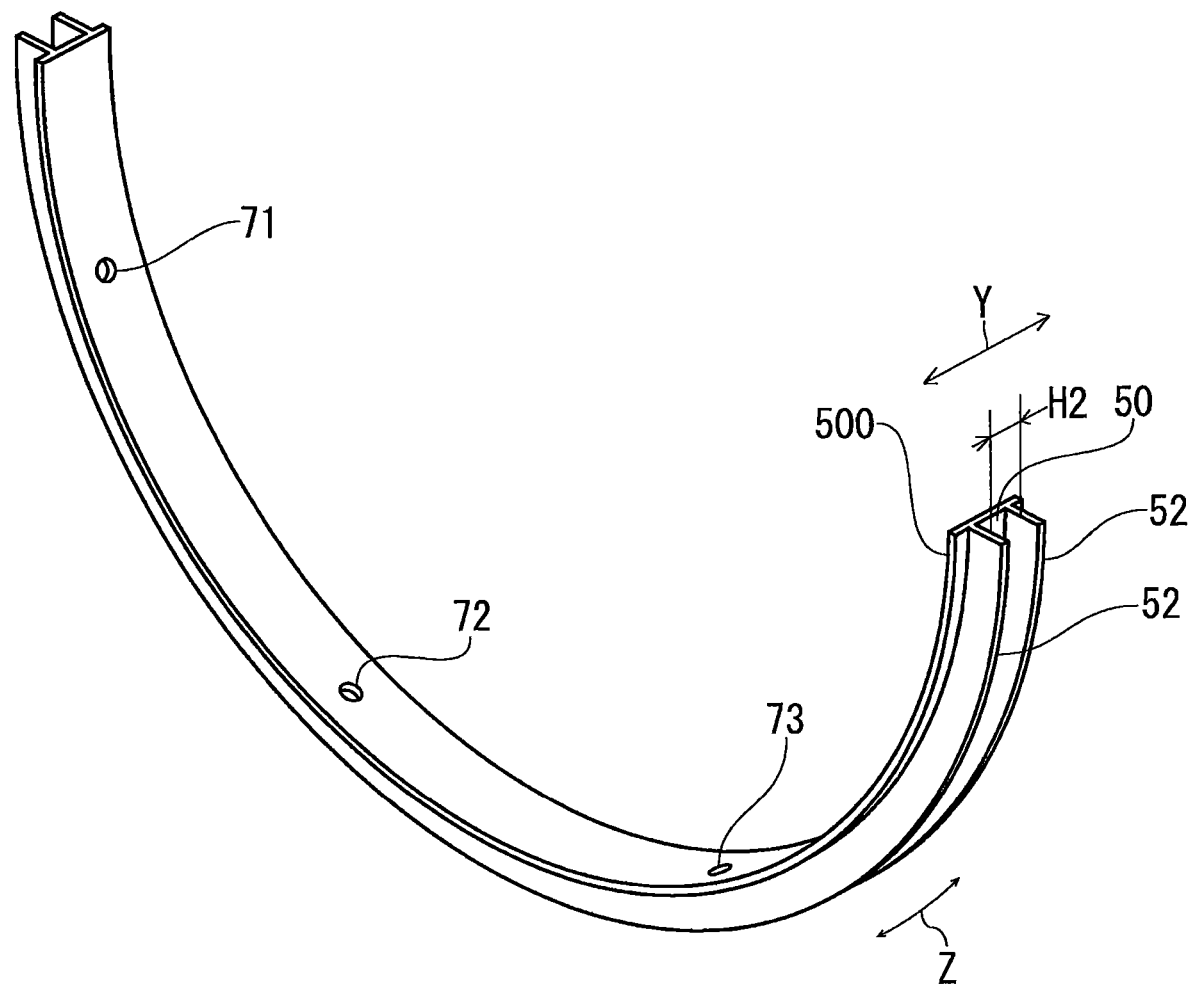
FIG. 10 is a perspective view showing the structure of a partition plate and reinforcing plates of the shaft seal portion shown in FIG. 8.
Figure 11:
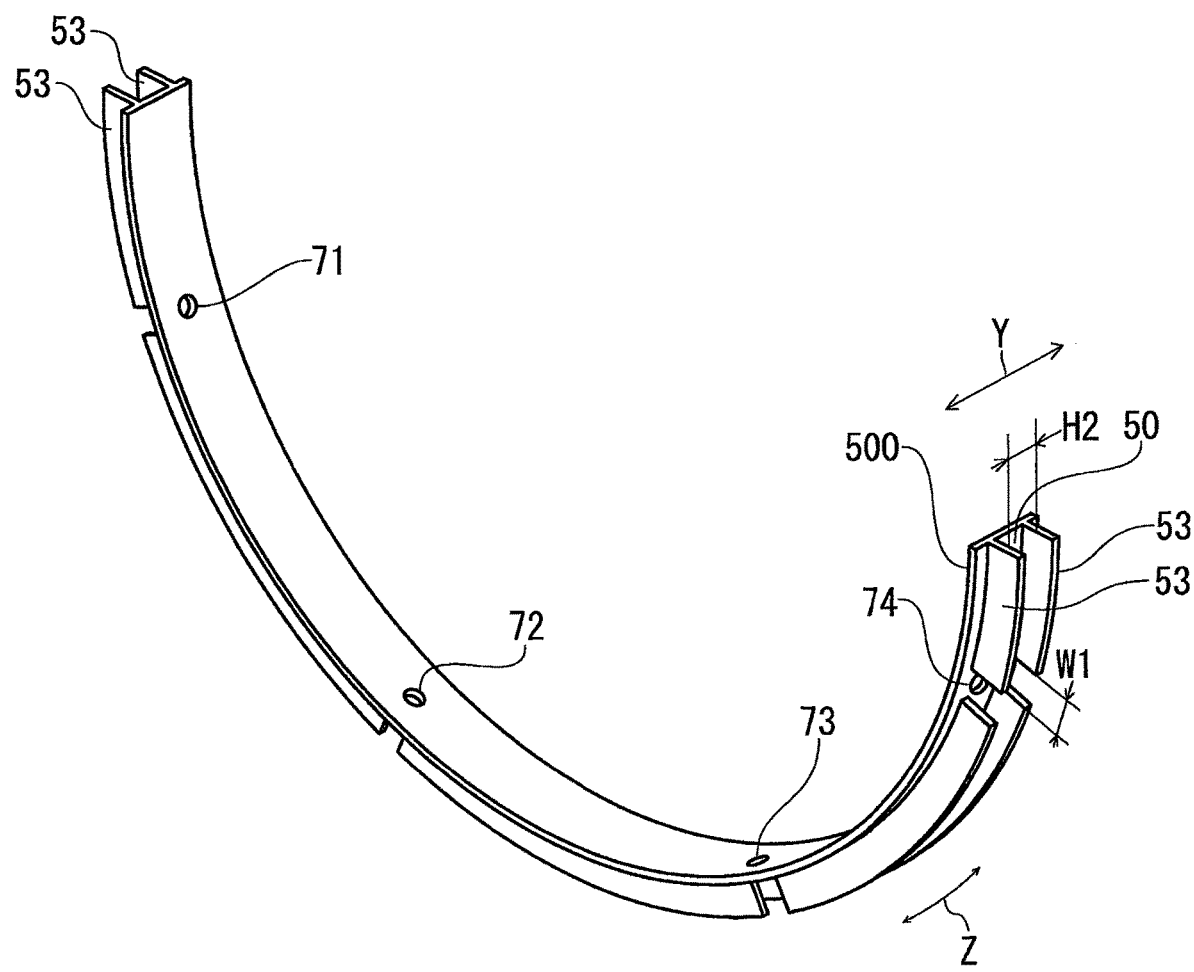
FIG. 11 is a perspective view showing another structure of a partition plate and reinforcing plates of the shaft seal portion shown in FIG. 8.

FIG. 7 is a sectional view showing the structure of a shaft seal portion 40 of a rotating electric machine according to embodiment 2 of the present invention. In FIG. 7, the left side on the drawing is outside the machine, and the right side on the drawing is inside the machine. FIG. 8 is a sectional view showing an A-A cross section of a gland seal 3 of the shaft seal portion 40 shown in FIG. 7. FIG. 9 is a sectional view showing a B-B cross section of the gland seal 3 of the shaft seal portion 40 shown in FIG. 7. FIG. 10 is a perspective view showing the structure of a partition plate and reinforcing plates of the shaft seal portion 40 shown in FIG. 7, and showing the half of the structure of the partition plate. FIG. 11 is a perspective view showing the half of another structure of a partition plate and reinforcing plates of the shaft seal portion 40 shown in FIG. 7, and showing the half of the structure of the partition plate.

In the drawings, the same parts as in the above embodiment 1 are denoted by the same reference characters and the description thereof is omitted. A partition plate 500 is configured in the same manner as the partition plate 5 of the above embodiment 1, and in the present embodiment 2, surrounds the entire circumference of the seal ring 1 and is provided on the outer side of the seal ring 1 and coaxially with the shaft 2. Thus, the partition plate 500 divides the backside chamber 4 into an outer side chamber 41 on the outer side in the radial direction X and an inner side chamber 42 on the inner side in the radial direction X.

In addition, the partition plate 500 has adjustment holes 71 to 78 penetrating in the radial direction X, at positions other than the position opposed to the oil feed port 62, and the adjustment holes 71 to 78 are formed at intervals in the circumferential direction Z. The adjustment holes 71 to 78 of the partition plate 500 are formed at positions other than the positions opposed to the through holes 22 of the seal ring 1. It is preferable that the number of the adjustment holes 71 to 78 of the partition plate 5 is the same as the number of the through holes 22 of the seal ring 1. As shown in FIG. 10, the partition plate 500 is divided in the circumferential direction Z, here, into two parts. The partition plate 500 divided in the circumferential direction Z into parts other than two parts is also applicable, though the number of steps for providing the partition plate 500 increases.

Reinforcing plates 52 are formed at such positions as not to obstruct the oil feed port 62 and not to obstruct the adjustment holes 71 to 78. The reinforcing plates 52 are fixed to the side wall 50 of the partition plate 500 on the gland seal 3 side and are in close contact with the circumferential wall 33 of the gland seal 3. The reinforcing plates 52 are formed at a plurality of, here, two different locations in the axial direction Y of the partition plate 5 (see FIG. 10). The reinforcing plates 52 are formed at two locations apart from each other by an interval H2 in the axial direction Y, and the seal oil 21 flows between the reinforcing plates 52 (through the outer side chamber 41). Here, the formation positions of the reinforcing plates 52 in the axial direction Y are on the outer sides with respect to the formation positions of the adjustment holes 71 to 78 in the axial direction Y. Thus, the outer side chamber 41 and the inner side chamber 42 in the radial direction X of the backside chamber 4 partitioned by the partition plate 500 are ensured as the paths for the seal oil 21.

The seal oil 21 passes through the oil feed port 62 to be supplied to, first, the outer side chamber 41 of the backside chamber 4. Then, the seal oil 21 moves along the partition plate 500 and the reinforcing plates 52, to be supplied to the inner side chamber 42 through the adjustment holes 71 to 78. Further, the seal oil 21 passes through the through holes 22 of the seal ring 1, to be supplied between the shaft 2 and the seal ring 1. The flow paths for the seal oil 21 are thus ensured, whereby the seal oil 21 is prevented from extremely cooling a specific one part of the seal ring 1, and while reliability is ensured, the gap T can be set to be small and the oil amount can be reduced.

A method for producing the rotating electric machine of embodiment 2 configured as described above will be described. First, one half part of the partition plate 500 divided in the circumferential direction Z as shown in FIG. 10 is placed, between the seal ring 1 and the gland seal 3, at a position opposed to the oil feed port 62, as in the above embodiment 1. The adjustment holes 71 to 74 of the partition plate 500 are located at positions other than the position opposed to the oil feed port 62 and other than the positions opposed to the through holes 22 of the seal ring 1. At this time, the placement is performed with the reinforcing plates 52 in contact with the circumferential wall 33 of the gland seal 3. Thus, the position of the partition plate 500 in the radial direction X of the gland seal 3 is located at a predetermined position.

While the reinforcing plates 52 are kept in contact with the circumferential wall 33 of the gland seal 3, both ends in the circumferential direction Z of the partition plate 500 which are at 180-degree positions (half in circumferential direction Z) are respectively welded and fixed to the upper wall 31 and the lower wall 32 of the gland seal 3. Next, the other part of the partition plate 500 divided in the circumferential direction Z is fixed to the gland seal 3 through the same process as described above. By fixing the partition plate 500 to the gland seal 3 in this way, it is possible to form the partition plate 500 in the gland seal 3 while keeping the predetermined position thereof over the entire circumference of the circumferential wall 33 of the gland seal 3. In addition, the reinforcing plates 52 are kept in close contact with the circumferential wall 33 of the gland seal 3 over the entire circumference thereof.

In the rotating electric machine and the rotating electric machine production method of embodiment 2 configured as described above, the same effects as in the above embodiment 1 are provided, and in addition, since the partition plate is provided with reinforcing plates in close contact with the entire circumference of the circumferential wall of the gland seal, it becomes possible to perform further highly accurate placement of the partition plate. In addition, since the partition plate has adjustment holes, the seal oil passes through the adjustment holes and thus flow paths therefor are reliably ensured, whereby the seal oil reliably fills the outer side chamber and the inner side chamber.

In the above embodiment 2, an example in which the adjustment holes 71 to 78 have the same size has been shown. However, without limitation thereto, for example, the sizes of the adjustment holes 71 to 78 may be enlarged with increase in distance from the oil feed port 62. By setting the sizes of the adjustment holes 71 to 78 in this way, the seal oil 21 can be supplied to the seal ring 1 side equally from all the adjustment holes 71 to 78. Here, the formation positions of the reinforcing plates 52 in the axial direction Y are on the outer sides with respect to the formation position of the largest one of the adjustment holes 71 to 78 in the axial direction Y. Regarding the sizes of the adjustment holes 71 to 78, the same applies to the following embodiments and the description thereof is omitted as appropriate.

In the above embodiment 2, an example in which each reinforcing plate 52 is formed over the entire circumference of the partition plate 500 has been shown. However, without limitation thereto, for example, as shown in FIG. 11, a plurality of reinforcing plates 53 may be formed apart from each other by intervals W1 in the circumferential direction Z. In this case, the intervals W1 are provided at the same positions as those of the adjustment holes 71 to 78 in the circumferential direction Z. Thus, flow paths for the seal oil 21 can be reliably ensured. The intervals W1 are formed to be larger than the sizes of the adjustment holes 71 to 78 in the circumferential direction Z.

Embodiment 3

Figure 12:
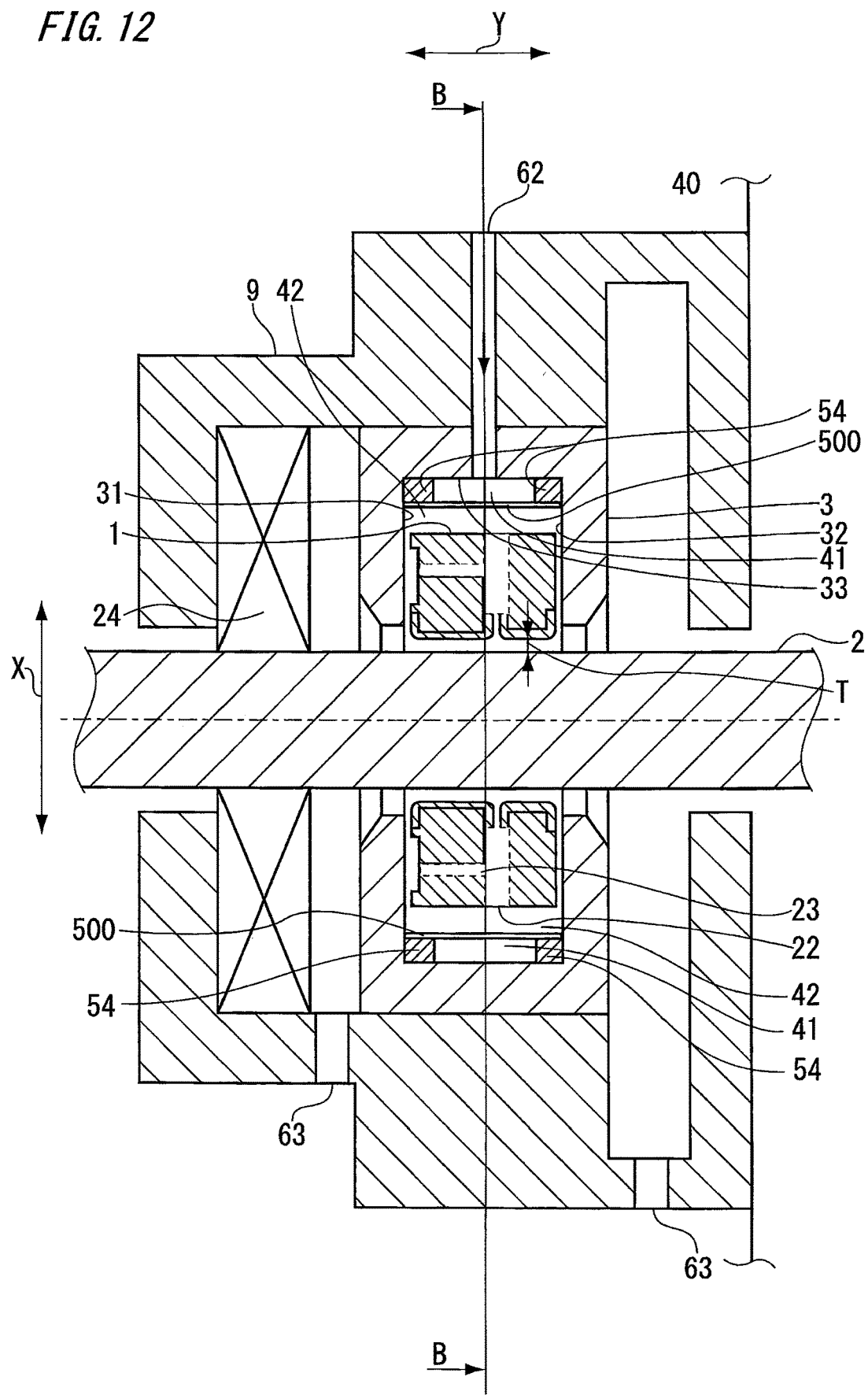
FIG. 12 is a sectional view showing the structure of a shaft seal portion of a rotating electric machine of embodiment 3 of the present invention.
Figure 13:
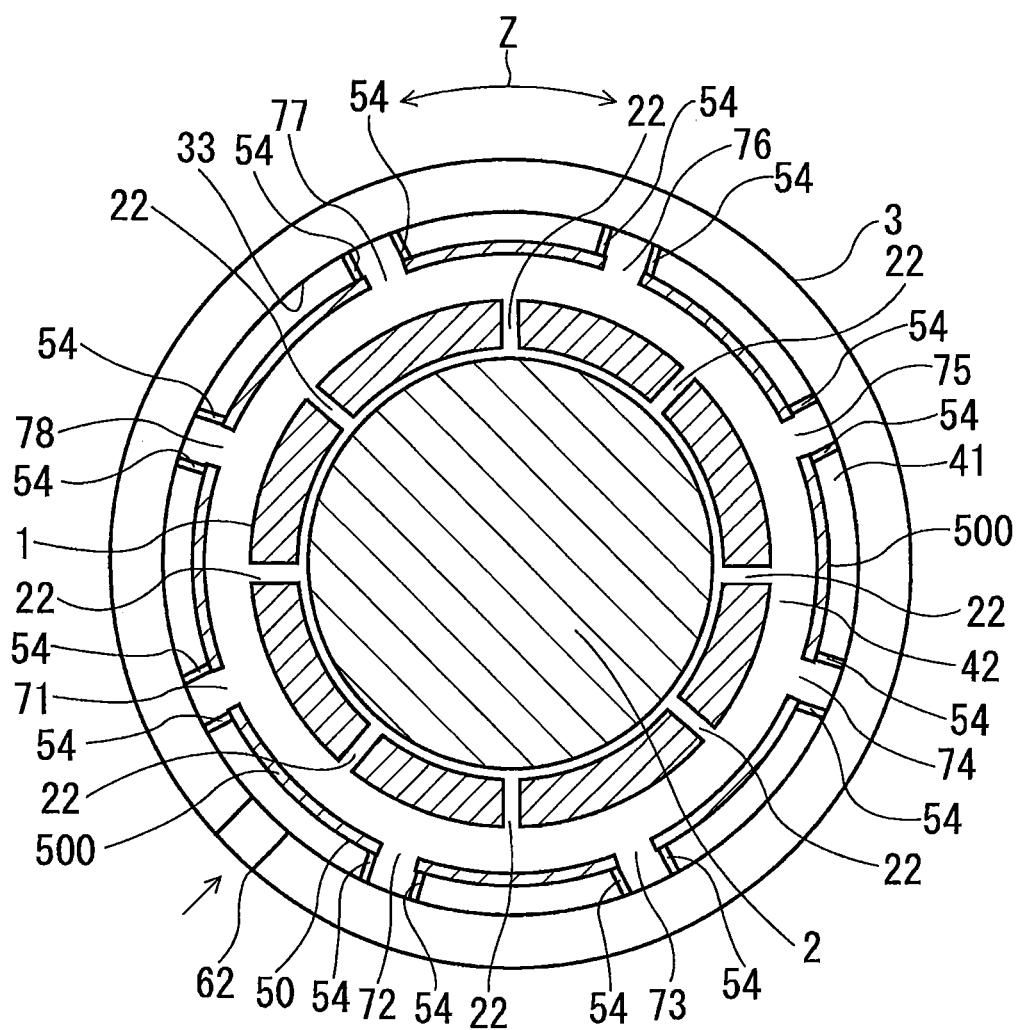
FIG. 13 is a sectional view showing a B-B cross section of the shaft seal portion shown in FIG. 12.

FIG. 12 is a sectional view showing the structure of a shaft seal portion 40 of a rotating electric machine according to embodiment 3 of the present invention. In FIG. 12, the left side on the drawing is outside the machine, and the right side on the drawing is inside the machine. FIG. 13 is a sectional view showing a B-B cross section of a gland seal 3 of the shaft seal portion 40 shown in FIG. 12. FIG. 15 is a perspective view showing the structure of a partition plate and reinforcing plates of the shaft seal portion 40 shown in FIG. 12, and showing the half of the structure of the partition plate.

In the drawings, the same parts as in the above embodiments are denoted by the same reference characters and the description thereof is omitted. Reinforcing plates 54 are formed at such positions as not to obstruct the oil feed port 62 and not to obstruct the adjustment holes 71 to 78. The reinforcing plates 54 are fixed to the side wall 50 of the partition plate 500 on the gland seal 3 side and are in close contact with the circumferential wall 33 of the gland seal 3. The reinforcing plates 54 are formed at a plurality of locations different in the axial direction Y and different in the circumferential direction Z of the partition plate 5, and here, formed at four locations for each of the adjustment holes 71 to 78 (see FIG. 14).

For each location of the adjustment holes 71 to 78, the reinforcing plates 54 are formed at four locations in total, i.e., two locations apart from each other by an interval H3 in the axial direction Y, and two locations apart from each other by an interval W2 in the circumferential direction Z. Here, the formation positions of the reinforcing plates 54 in the axial direction Y are on the outer sides with respect to the formation positions of the adjustment holes 71 to 78 in the axial direction Y. In addition, the formation positions of the reinforcing plate 54 in the circumferential direction Z are on the outer sides with respect to the formation positions of the adjustment holes 71 to 78 in the circumferential direction Z.

Figure 14:
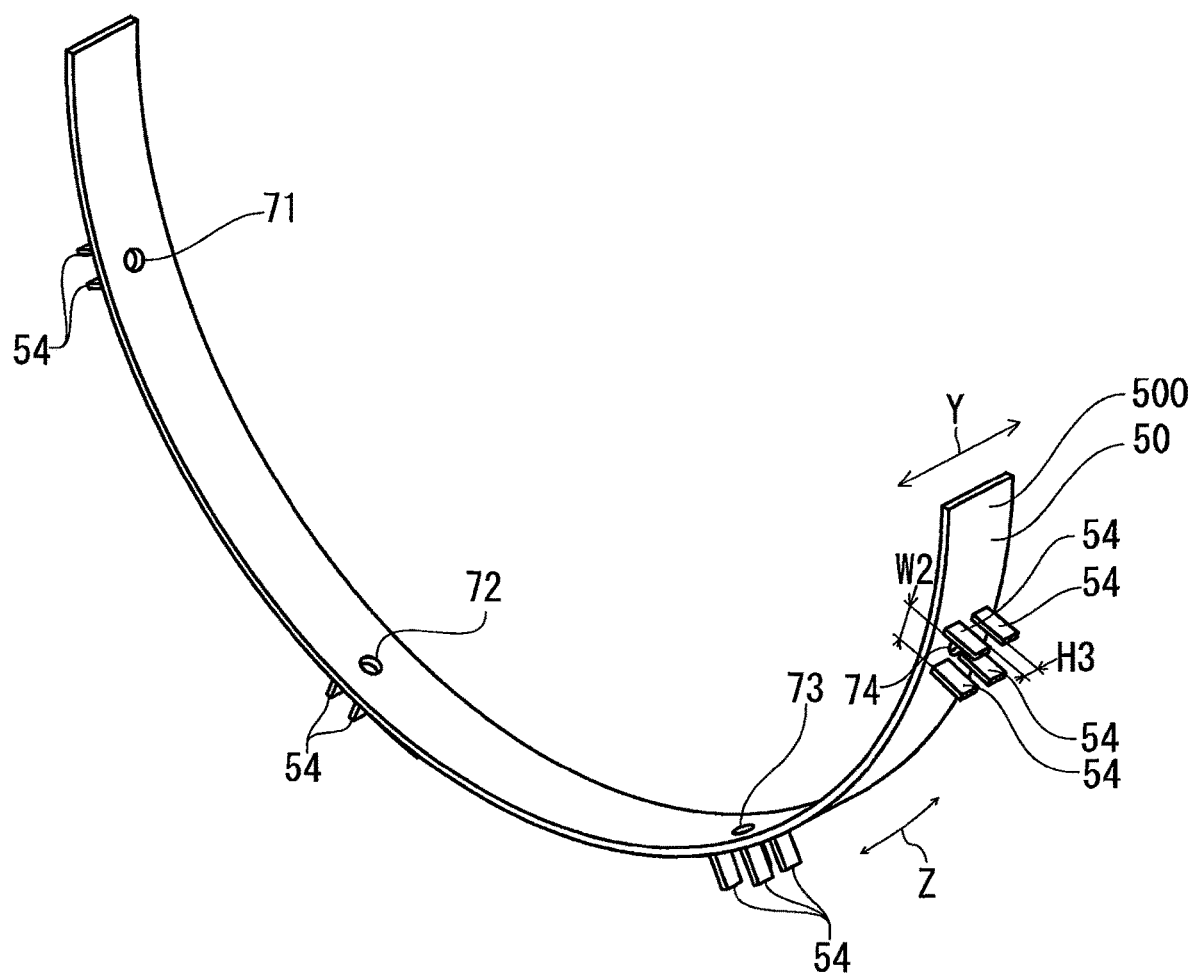
FIG. 14 is a perspective view showing the structure of a partition plate and reinforcing plates of the shaft seal portion shown in FIG. 13.

A method for producing the rotating electric machine of embodiment 3 configured as described above will be described. First, as in the above embodiment 2, one half part of the partition plate 500 divided in the circumferential direction Z as shown in FIG. 14 is placed, between the seal ring 1 and the gland seal 3, at a position opposed to the oil feed port 62. The adjustment holes 71 to 74 of the partition plate 500 are located at positions other than the position opposed to the oil feed port 62 and other than the positions opposed to the through holes 22 of the seal ring 1. At this time, the placement is performed with the reinforcing plates 54 in contact with the circumferential wall 33 of the gland seal 3. Thus, the position of the partition plate 500 in the radial direction X of the gland seal 3 is located at a predetermined position.

While the reinforcing plates 54 are kept in contact with the circumferential wall 33 of the gland seal 3, both ends in the circumferential direction Z of the partition plate 500 which are at 180-degree positions are respectively welded and fixed to the upper wall 31 and the lower wall 32 of the gland seal 3. Next, the other part of the partition plate 500 divided in the circumferential direction Z is fixed to the gland seal 3 through the same process as described above. By fixing the partition plate 500 to the gland seal 3 in this way, it is possible to form the partition plate 500 in the gland seal 3 while keeping a distance from the circumferential wall 33 of the gland seal 3 over the entire circumference thereof. In addition, the reinforcing plates 54 are kept in close contact with the circumferential wall 33 of the gland seal 3 at a plurality of locations over the entire circumference thereof.

In the rotating electric machine and the rotating electric machine production method of embodiment 3 configured as described above, the same effects as in the above embodiments are provided, and in addition, it is not necessary to form the reinforcing plates over the entire circumference of the partition plate and thus they can be formed with low cost. In addition, the degree of freedom in locations where the reinforcing plates are formed increases, whereby the degree of freedom in the flow paths for the seal oil increases and thus it becomes easy to ensure desired flow paths for the seal oil.

In the above embodiment 3, an example in which the reinforcing plates 54 are located near the adjustment holes 71 to 78 of the partition plates 500 has been shown. However, without limitation thereto, the reinforcing plates 54 may be formed in each interval in the circumferential direction Z between the adjustment holes 71 to 78 of the partition plate 500.

It is noted that, within the scope of the present invention, the above embodiments may be freely combined with each other, or each of the above embodiments may be modified or simplified as appropriate.

The invention claimed is:

1. A rotating electric machine comprising:
   a rotor having a shaft;
   a stator formed around the rotor;
   a seal ring formed around the shaft and having a plurality of through holes;
   a gland seal formed so as to surround the seal ring and having an oil feed port;
   a partition plate formed between the seal ring and the gland seal; and
   a housing which houses the rotor and the stator and to which the gland seal is fixed, wherein
   the partition plate is formed at a position opposed to the oil feed port and is fixed to at least one of an upper wall and a lower wall in an axial direction of the gland seal, and
   the partition plate has a reinforcing plate at such a position as not to obstruct the oil feed port, the reinforcing plate being fixed to a side wall of the partition plate on a gland seal side and being in close contact with a circumferential wall of the gland seal.

2. The rotating electric machine according to claim 1, wherein
   the reinforcing plate comprises reinforcing plates formed at a plurality of different locations in the axial direction of the partition plate.

3. The rotating electric machine according to claim 1, wherein
   the partition plate is formed so as to surround an entire circumference of the seal ring, and
   the reinforcing plate is formed so as to surround an entire circumference of the partition plate.

4. The rotating electric machine according to claim 1, wherein
   the reinforcing plate comprises reinforcing plates formed at a plurality of different locations in a circumferential direction of the partition plate.

5. The rotating electric machine according to claim 1, wherein
   the partition plate has an adjustment hole penetrating in a radial direction, at a position other than a position opposed to the oil feed port, and
   the reinforcing plate is formed at such a position as not to obstruct the adjustment hole.

6. The rotating electric machine according to claim 2, wherein
   the partition plate has an adjustment hole penetrating in a radial direction, at a position other than a position opposed to the oil feed port, and
   formation positions of the reinforcing plates in the axial direction are on outer sides with respect to a formation position of the adjustment hole in the axial direction.

7. The rotating electric machine according to claim 5, wherein
   the adjustment hole of the partition plate comprises adjustment holes formed at a plurality of locations in a circumferential direction of the partition plate.

8. The rotating electric machine according to claim 1, wherein
   the partition plate is formed so as to be divided in a circumferential direction.

9. A method for manufacturing the rotating electric machine according to claim 1, the method comprising:
   placing the partition plate at a position opposed to the oil feed port, and bringing the reinforcing plate into contact with the circumferential wall of the gland seal, and in this state, welding and fixing the partition plate to the upper wall or the lower wall of the gland seal.

10. The rotating electric machine according to claim 2, wherein
   the partition plate is formed so as to surround an entire circumference of the seal ring, and
   the reinforcing plate is formed so as to surround an entire circumference of the partition plate.

11. The rotating electric machine according to claim 2, wherein
   the reinforcing plate comprises reinforcing plates formed at a plurality of different locations in a circumferential direction of the partition plate.

12. The rotating electric machine according to claim 2, wherein
   the partition plate has an adjustment hole penetrating in a radial direction, at a position other than a position opposed to the oil feed port, and
   the reinforcing plate is formed at such a position as not to obstruct the adjustment hole.

13. The rotating electric machine according to claim 3, wherein
   the partition plate has an adjustment hole penetrating in a radial direction, at a position other than a position opposed to the oil feed port, and
   the reinforcing plate is formed at such a position as not to obstruct the adjustment hole.

14. The rotating electric machine according to claim 4, wherein
   the partition plate has an adjustment hole penetrating in a radial direction, at a position other than a position opposed to the oil feed port, and
   the reinforcing plate is formed at such a position as not to obstruct the adjustment hole.

15. The rotating electric machine according to claim 6, wherein
   the adjustment hole of the partition plate comprises adjustment holes formed at a plurality of locations in a circumferential direction of the partition plate.

16. The rotating electric machine according to claim 12, wherein
   the adjustment hole of the partition plate comprises adjustment holes formed at a plurality of locations in a circumferential direction of the partition plate.

17. The rotating electric machine according to claim 13, wherein
   the adjustment hole of the partition plate comprises adjustment holes formed at a plurality of locations in a circumferential direction of the partition plate.

18. The rotating electric machine according to claim 14, wherein
   the adjustment hole of the partition plate comprises adjustment holes formed at a plurality of locations in a circumferential direction of the partition plate.

19. The rotating electric machine according to claim 2, wherein
   the partition plate is formed so as to be divided in a circumferential direction.

20. The rotating electric machine according to claim 3, wherein
   the partition plate is formed so as to be divided in a circumferential direction.

\* \* \* \* \*